United States Patent [19]
Siddiqui et al.

[11] Patent Number: 5,706,982
[45] Date of Patent: Jan. 13, 1998

[54] MOLTEN THERMOPLASTIC MATERIAL SUPPLY SYSTEM WITH DISTRIBUTION MANIFOLD HAVING REVERSE FLUSH FILTER AND AUTOMATIC DRAIN

[75] Inventors: Shahid A. Siddiqui, Roswell; Jim B. Bassett, Stone Mountain, both of Ga.

[73] Assignee: Nordson Corporation, Westlake, Ohio

[21] Appl. No.: 550,388

[22] Filed: Oct. 30, 1995

[51] Int. Cl.[6] .................................................. B67D 5/62
[52] U.S. Cl. ...................... 222/146.5; 210/108; 210/130; 219/421; 222/189.06
[58] Field of Search ............... 222/146.1, 146.2, 222/146.5, 189.06, 189.11, 318; 219/420, 421, 422, 424, 426, 427, 521; 210/108, 130, 136, 184, 234, 233.01, 393, 411, 427

[56] References Cited

U.S. PATENT DOCUMENTS

| | | | |
|---|---|---|---|
| 3,912,630 | 10/1975 | Reighard et al. | 210/130 |
| 3,964,645 | 6/1976 | Scholl | 222/146.5 |
| 4,485,941 | 12/1984 | Frates et al. | 222/189.11 |
| 4,598,841 | 7/1986 | Smiles | 222/189.06 |
| 4,666,066 | 5/1987 | Boccagno et al. | 222/146.5 |
| 4,667,850 | 5/1987 | Scholl et al. | 222/146.5 X |
| 4,734,188 | 3/1988 | Burdette, Jr. et al. | 210/107 |

*Primary Examiner*—Kevin P. Shaver
*Attorney, Agent, or Firm*—Rankin, Hill, Lewis & Clark

[57] ABSTRACT

A system for supplying molten thermoplastic material to a dispenser through a supply hose comprises a hopper for storing the thermoplastic material. A heating grid associated with the hopper heats and melts the thermoplastic material. A reservoir block receives the melted material from the grid. The reservoir block includes a reservoir into which the melted material flows from the grid. A manifold assembly is supported below the reservoir block for receiving material from the reservoir. The manifold assembly includes a fitting for connection to the supply hose, a pump for pumping the material through the supply hose to the dispenser, a passageway system connecting the pump to the fitting for supplying a flow of material from the pump to the fitting, a filter connected to the passageway system for filtering impurities in the material after the material has been pumped, and a valving arrangement connected to the passageway system and separate from the filter which selectively directs a flow of the material in the passageway system through the filter to backflush the filter. The filter and the valving arrangement permit the filter to be removed without dislodging the contaminants in the filter. The backflushing capability allows the filter to be cleaned periodically without removal of the filter and without changing the position of the filter. When the filter is backflushed, the material flows through a drain valve assembly which opens automatically in response to pressure of the material from the pump.

19 Claims, 15 Drawing Sheets

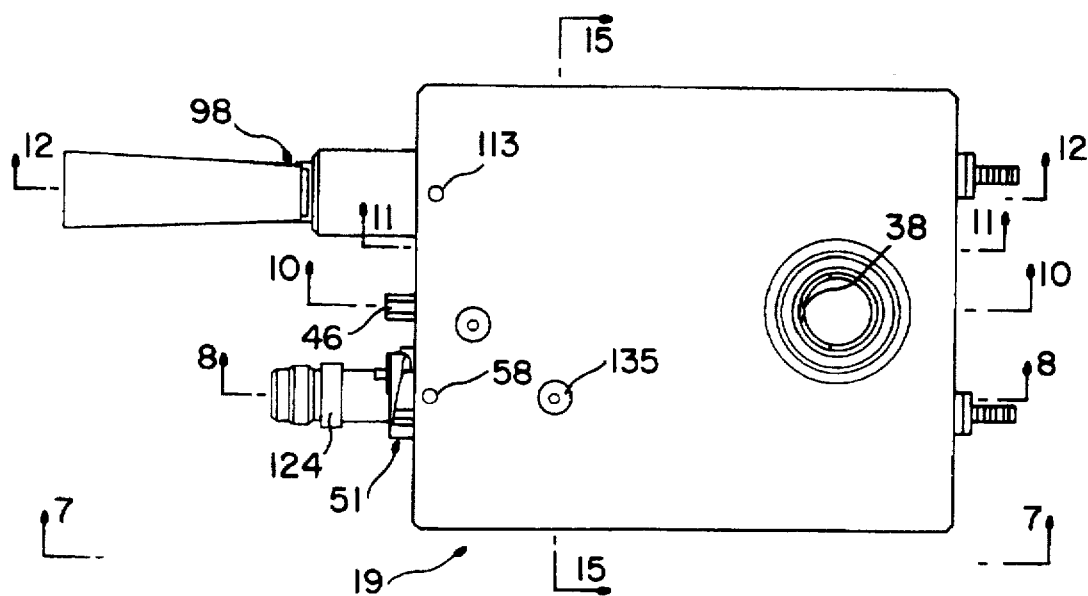
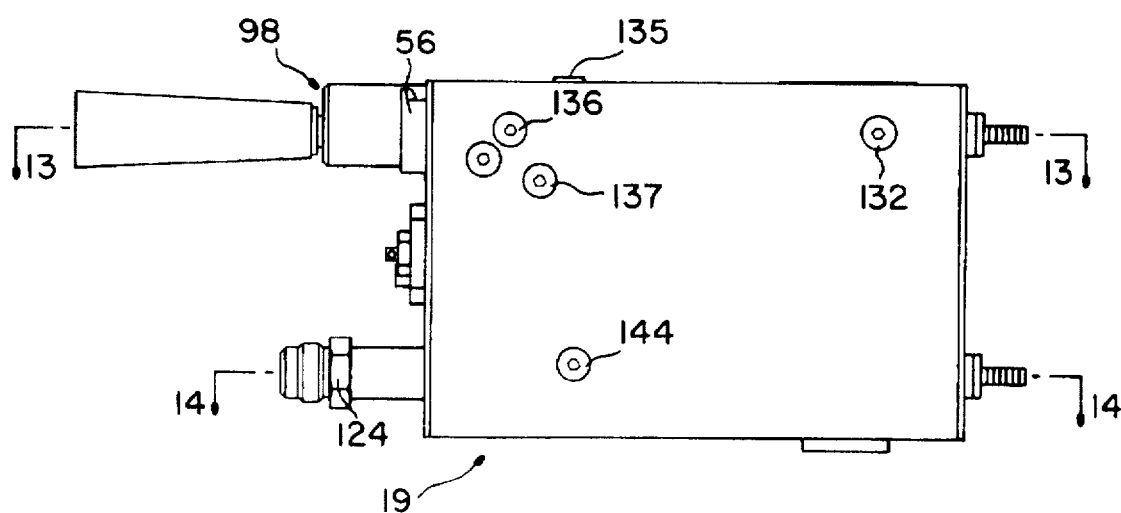

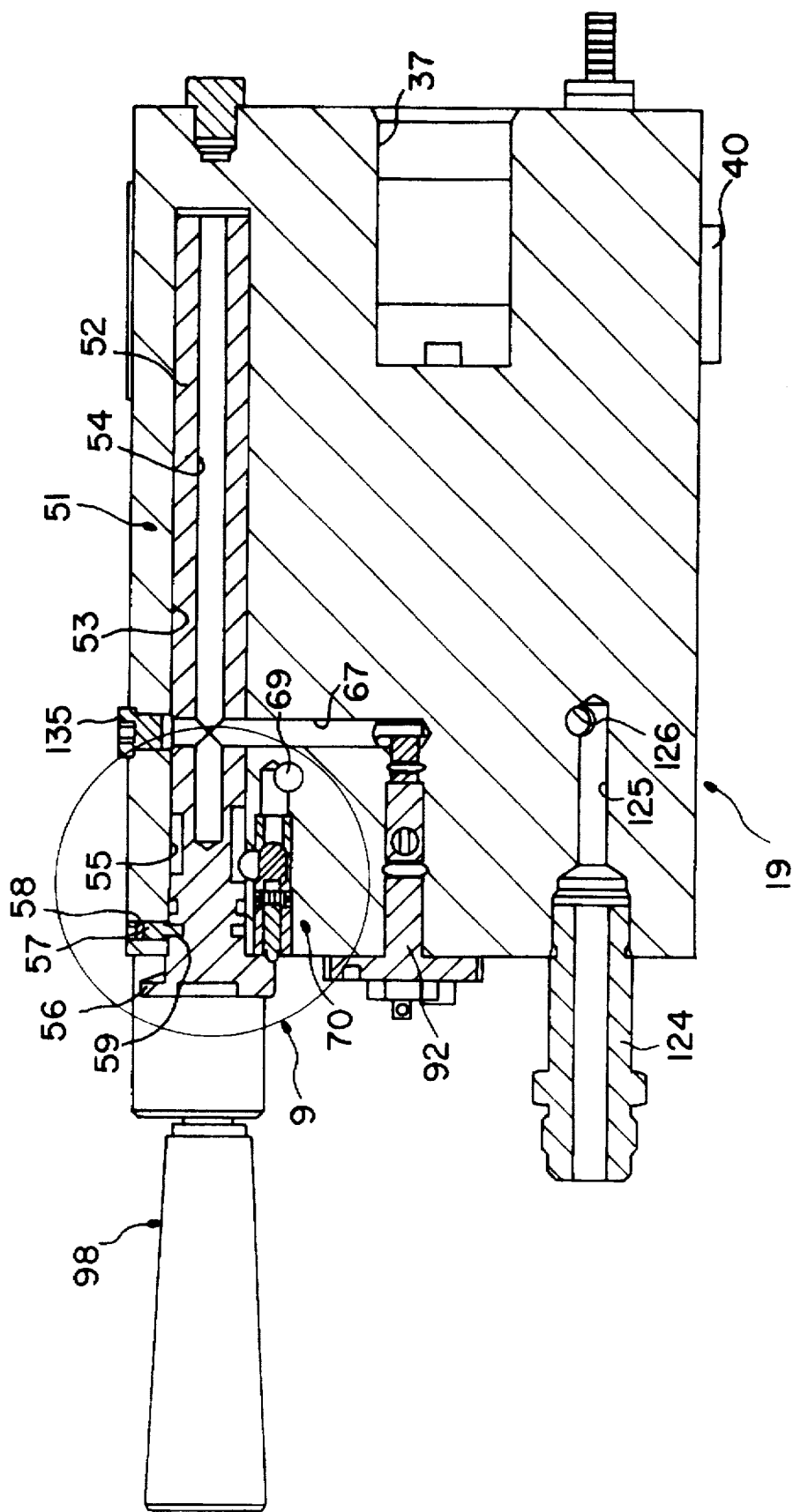

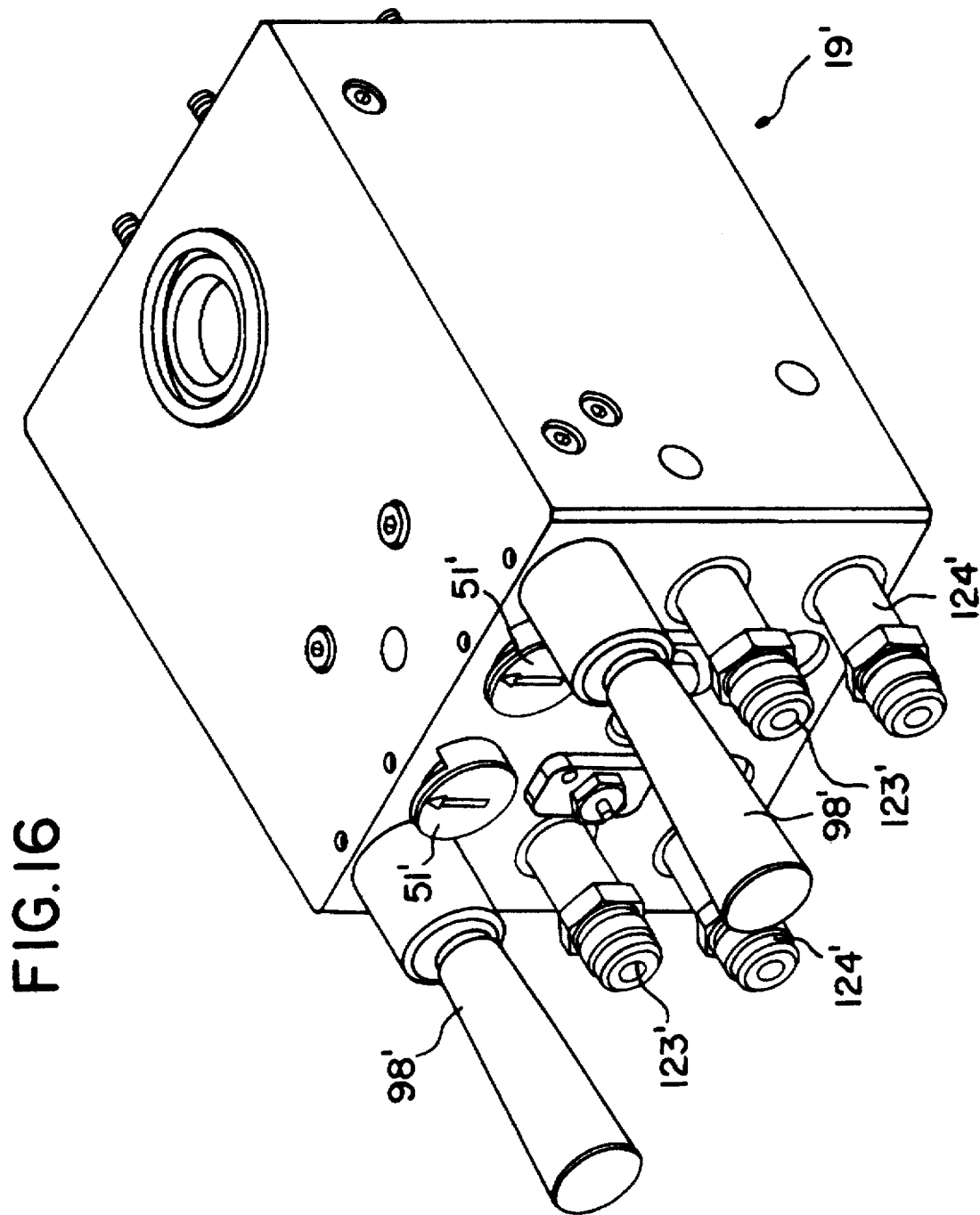

MOLTEN THERMOPLASTIC MATERIAL SUPPLY SYSTEM WITH DISTRIBUTION MANIFOLD HAVING REVERSE FLUSH FILTER AND AUTOMATIC DRAIN

BACKGROUND OF THE INVENTION

1. Field of the Invention

This invention relates to apparatus for melting and supplying thermoplastic materials to a dispensing system.

2. Description of the Prior Art

Thermoplastic materials or so-called "hot melt" materials have been used for many years for various purposes, including as adhesives in the manufacturing of products such as disposable diapers and in the manufacturing of packaging. Historically, the thermoplastic material was converted from a solid to a molten state in a tank having heated walls. The melted material was maintained in the molten state in the tank in sufficient volume to supply one or more applicators or dispensers. If the job or application required a substantial volume of hot melt material, a substantially large volume of material was required to be maintained in the molten or melted state, necessitating a long warm-up or start-up time for the apparatus, as well as prolonged exposure of at least some of the molten material to heat and/or to oxygen.

To avoid these problems, so-called grid-type hot melt supply systems were developed in which the solid thermoplastic material was stored in a hopper and melted upon the top of a heated grid located at the bottom of the hopper. The melted material then passed through holes in the grid into a relatively small holding reservoir from which the molten material was supplied by a pump beneath the reservoir to a dispenser. Grid-type supply systems have been capable of melting and supplying thermoplastic material in a very high rate, and the molten material is not maintained in a molten state for prolonged periods of time to char, oxidize, or otherwise degrade. A typical grid type hot melt supply system is disclosed in U.S. Pat. No. 3,946,645.

These grid-type hot melt supply systems have typically comprised a reservoir with a heated grid mounted on top of the reservoir. A hopper for receiving the solid thermoplastic material was mounted atop the heated grid. Mounted beneath the reservoir was at least one pump for pumping the molten thermoplastic material through one or more supply hoses that were connected to the pump. The pump could be mounted in a distribution manifold. A flow passage was provided from the reservoir outlet to the pump inlet.

One problem with these hot melt supply systems has been that, in use, various extraneous objects or impurities could enter the hopper. Larger objects and impurities were prevented from passing through the openings in the grid, but smaller impurities could pass through the grid and eventually reach the pump, where they could be pumped to the dispenser. These impurities could clog the supply line to the dispenser or result in periodic failure or clogging of the dispenser. If the supply line became clogged or if the dispenser failed or became clogged, it had to be removed and repaired or replaced. In some prior art supply systems, a manually operated gate-type valve has been provided in the molten thermoplastic flow path between the reservoir outlet and the pump. An example of such a valve is shown in U.S. Pat. No. 4,666,066. This valve made it possible to stop the flow of molten thermoplastic material to the pump whenever the pump needed to be removed or the flowpath otherwise cleaned, without the necessity of first draining the entire reservoir of molten thermoplastic material. Another example of a flow shutoff valve that could be used to shut off the flow of material to the pump is shown in U.S. Pat. No. 4,667,850.

The problems of contaminants clogging the material flow path can be reduced by providing a filter in the material flow path between the reservoir and the supply hose, and several filtering arrangements have been proposed. If the filter must be removed to be cleaned periodically, the supply system must be shut down each time the filter is removed, resulting in loss of system productivity. If it is difficult to remove and reinstall the filter, the system downtime is increased. In supplying hot-melt adhesive materials, interrupting the flow of the materials can be particularly inefficient, since the material must be maintained within a predetermined temperature range, and, if the material is allowed to cool, it must be re-heated within the material flow path.

One solution to this problem has been to provide a filter that can be rotated so that the thermoplastic material is used to backflush the filter. An example of such a filter is shown in U.S. Pat. No. 4,734,188. This filter is mounted so as to be capable of being rotated 180° within the manifold. The filter is rotatable between a filtering position in which the material is directed to the inner core of the filter and a back flushing position in which the material is directed onto the outside surface of the filter. Even with this backflushing capability, however, the filter should be removed periodically for a thorough cleaning, and the arrangement in which the filter is rotated makes it difficult to remove the filter without dislodging the contaminants and spilling the contaminants into the material flowpath.

SUMMARY OF THE INVENTION

The present invention overcomes the difficulties of the prior art by providing a manifold between the reservoir and the pump which incorporates a unique filter design. In accordance with this invention, a molten thermoplastic supply system is provided in which the manifold has a filter and a valving arrangement which permits the filter to be removed without dislodging the contaminants in the filter. The backflushing capability allows the filter to be cleaned periodically without removal of the filter and without changing the position of the filter. By using a separate valve to change the direction of the material stream in order to backflush the filter, the filter can be cleaned of minor accumulations of contaminants with a minimum of system downtime.

In accordance with the invention, filter backflushing is accomplished by providing a separate valve in the manifold block which can be set in a "run" position and in a "flush" position. When the valve is set in the "run" position, the molten thermoplastic material flows from the pump, through the valve, through the filter and to a hose fitting which can be connected to a supply hose. When the valve is set in the "flush" position, the molten thermoplastic material flows from the pump, through the valve, backwards through the filter, and to a drain.

The system of the present invention includes an automatic drain which opens only when the filter is being backflushed, preventing leakage through the drain when the system is in normal running operation. The automatic drain includes a drain valve which opens automatically when the main valve is in the "flush" position. The drain valve utilizes the pressure of the backflushed fluid along with geometry of the main valve to open the drain valve, so that the valve opens reliably and consistently when backflushed fluid is present.

When it is necessary to remove the filter, the present invention provides a filter which can be removed easily and quickly, minimizing the amount of time that the system must be shut down. The filter can be removed easily from the manifold without tools and with minimal operational steps. The filter is released from the manifold simply by turning the handle several turns, and the filter is resecured in the manifold by simple turns of the handle in the opposite direction. The removal and replacement steps are performed without rotating the filter itself, so that contaminants within the filter are not disturbed.

These and other advantages are provided by the present invention of a system for supplying melted thermoplastic material to a dispenser through a supply hose. The system comprises a hopper for storing the thermoplastic material. A heating grid associated with the hopper heats and melts the thermoplastic material, and a reservoir block receives the melted material from the grid. The reservoir block includes a reservoir into which the melted material flows from the grid. A manifold assembly is supported below the reservoir block for receiving material from the reservoir. The manifold assembly includes a fitting for connection to the supply hose, a pump for pumping the material through the supply hose to the dispenser, a passageway system connecting the pump to the fitting for supplying a flow of material from the pump to the fitting, a filter connected to the passageway system for filtering impurities in the material after the material has been pumped, and a valving arrangement connected to the passageway system and separate from the filter which selectively directs a flow of the material in the passageway system through the filter to backflush the filter.

BRIEF DESCRIPTION OF THE DRAWINGS

FIG. 6 is a top plan view of the manifold block of FIG. 4.

FIG. 7 is a side elevational view of the manifold block taken along line 7—7 of FIG. 6.

FIG. 8 is a side sectional view taken along line 8—8 of FIG. 6.

FIG. 16 is a perspective view similar to FIG. 4 of another embodiment of the manifold block.

DETAILED DESCRIPTION OF THE PREFERRED EMBODIMENT

Figure 1:
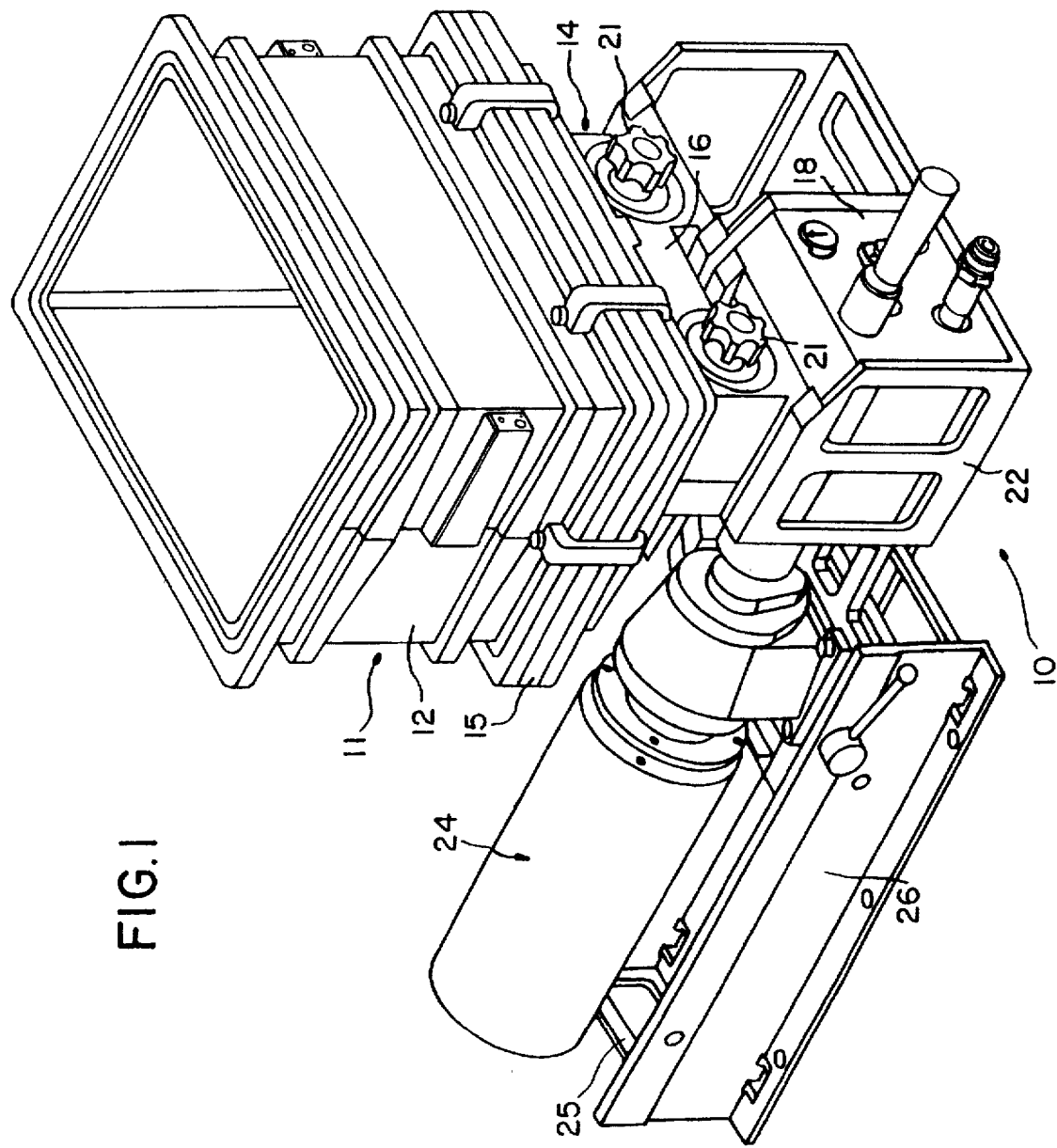
FIG. 1 is a perspective front view of the thermoplastic supply system of the present invention, with the support structure omitted.
Figure 2:
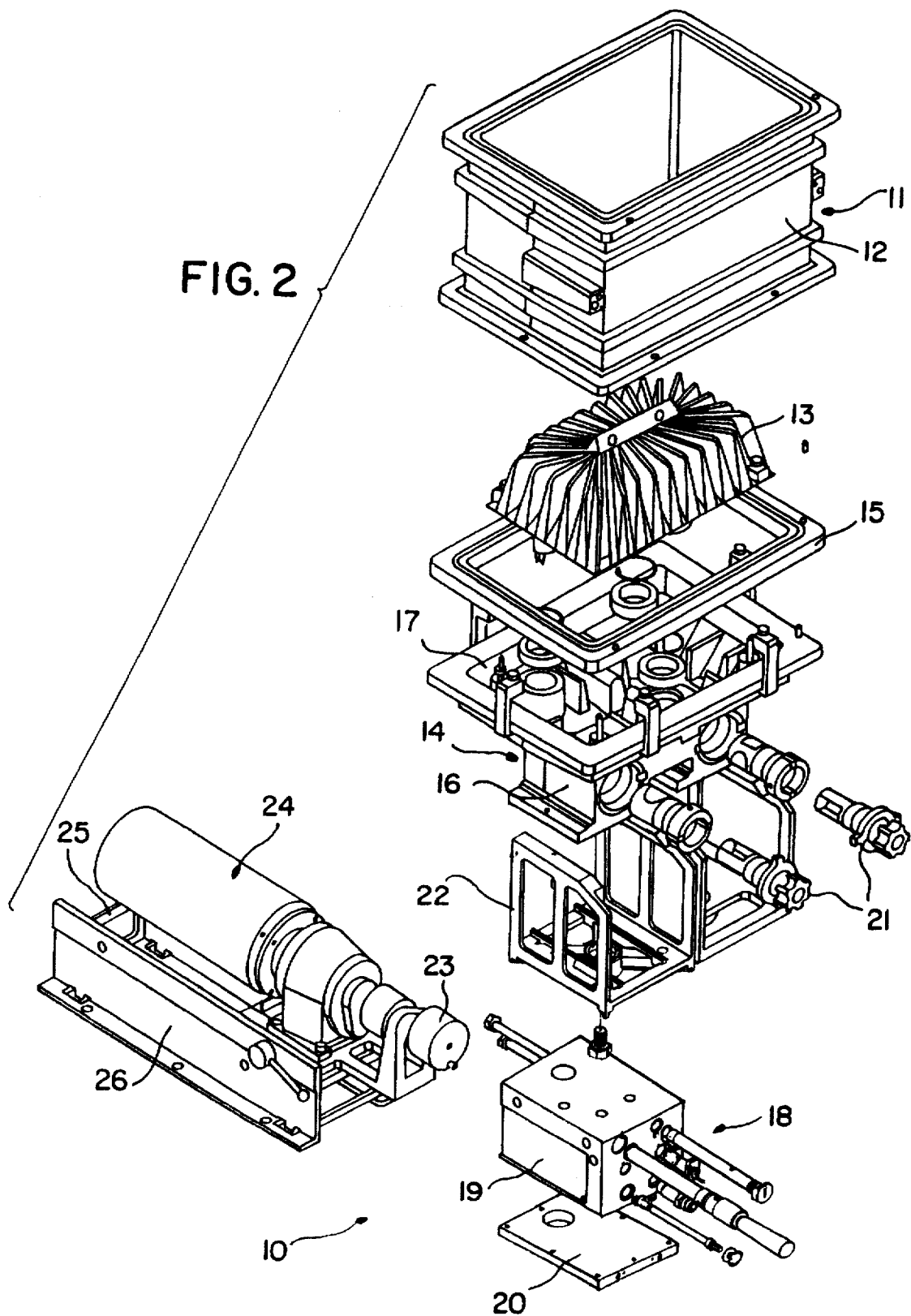
FIG. 2 is an exploded perspective front view of the thermoplastic supply system of FIG. 1.

Referring more particularly to the drawings and initially to FIGS. 1 and 2, there is shown the thermoplastic material supply system 10 of the present invention. The system is used for various purposes, such as to apply hot melt adhesive in a manufacturing line for specific products, such as for disposable diapers. A manufacturing line of disposable diapers may include, by way of example, a station for applying adhesive to the left and right leg elastic, to the waist elastic attachment and to the cuff elastic. The supply system 10 is connected to dispensers or applicators located at the manufacturing line by means of heated supply hoses. Various types of dispensers or applicators may be in the manufacturing line to apply the material, and these dispensers are not part of this invention. The supply system 10 is used to heat the solid thermoplastic material and to supply the molten material through various numbers of supply hoses to the dispensers.

The system 10 comprises a hopper assembly 11 for receiving and storing a supply of solid thermoplastic material. The hopper assembly 11 comprises one or more hopper units 12. The top of the hopper assembly 11 is open, allowing solid thermoplastic material to be placed in the hopper assembly. The bottom of the hopper assembly 11 is also open providing an outlet, and a heating grid 13 is mounted within the outlet of the hopper assembly. The heating grid 13 is used to melt the solid thermoplastic material in the hopper. Although the grid 13 is not in the form of a grid in the conventional definition of the term, since it is in the form of a pyramid-shaped cast block, it replaces the heating grids used in prior art systems, so it is called a "grid." The hopper assembly 11 is supported on a reservoir assembly 14 located below the hopper assembly 11, with a ceramic isolator 15 mounted therebetween. The reservoir assembly includes a block 16, the upper surface of which forms a reservoir 17 which receives a supply of melted material from the hopper assembly 11. Inside the reservoir block 16 are a pair of passageways through which the molten thermoplastic flows from the reservoir to a pair of manifold assemblies 18 positioned beneath the reservoir block. (Only one of the manifold assemblies is shown in FIGS. 1 and 2.) Each manifold assembly 18 includes a manifold block 19. The manifold block 19 may include an internal heater or may be heated by means of a separate attached heater plate 20. The reservoir assembly 14 includes a pair of flow shutoff valves 21 mounted in the reservoir block 16 each of which allows the flow of molten material through one of the passageways to one of the manifold assemblies to be shut off. Each of the flow shutoff valves 21 also includes a filter or protection screen to prevent extraneous particulate material from reaching the pump. The manifold assemblies 18 are inserted into a manifold harness or saddle 22 which is suspended from the bottom of the reservoir block 16. The manifold assembly is inserted into the harness and held securely against the reservoir block by means of a screw jack assembly. A pump 23 is adapted to be inserted into each of the manifold assemblies 18. Each of the pumps 23 is connected to a drive assembly 24, and the pump and the drive assembly are mounted on a horizontally moveable carriage 25 which moves on a carriage support 26. Each of the manifold assemblies 18 includes a connection for one or more supply hoses (not shown). The molten thermoplastic material is pumped from the manifold assembly 18 to dispensing heads through the supply hoses.

Figure 3:
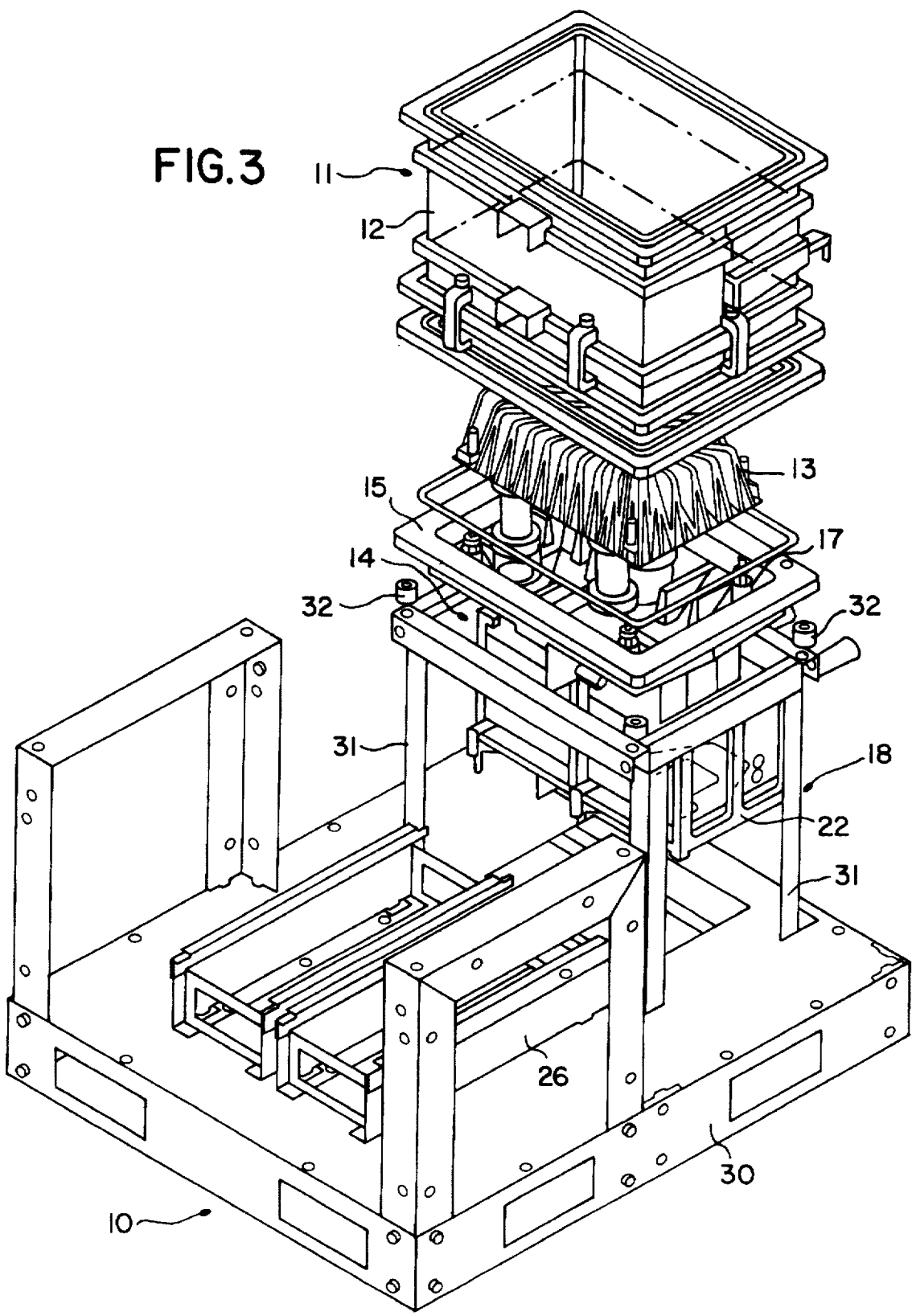
FIG. 3 is another exploded perspective view of the thermoplastic supply system of FIGS. 1 and 2 taken from the rear of the system with the support structure included, but with the drive assembly removed.

The support structure for the supply system 10 is not shown in FIGS. 1 and 2 for the sake of clarity, but it is depicted in FIG. 3. As shown in FIG. 3, the supply system 10 is supported on a base 30 upon which an upstanding frame 31 is mounted. The carriage support 26 is also mounted on the base 30. The reservoir block 16 is supported on the frame 31 with a plurality of isolating spacers 32 mounted therebetween.

While two flow shutoff valves, two manifold assemblies, and two pumps and drive assemblies are shown or described, this is intended to show a typical configuration of the system, and it should be understood that one or more of each of these elements could be used.

As used herein, the "front" of the system 10 and its components is considered to be the side of the system extending forward and to the right in FIGS. 1 and 2, which is also the side from which the shutoff valves 21 are mounted. The "rear" of the system 10 and its components is considered to be the opposite side, that is, the side extending back and to the left in FIG. 1 and 2, which is also the side from which the drive assembly 24 extends.

The manifold block 19 is a solid block of a suitable material, such as aluminum, which is strong, but lightweight, and has sufficient heat conducting capabilities. The manifold block 19 does not have any heating elements within it, but it is heated by the manifold heater plate 20 which is attached to it. The plate 20 is generally rectangular and is made from a casting of a suitable material, such as aluminum, which has good heat conductivity. An electrical induction heater is cast into the plate 20, with terminals extending from the rearward end of the plate for connection to a suitable electric cable which leads to a control. The plate 20 also preferably has an opening for insertion of a suitable temperature probe, such as an RTD or thermocouple. Drain openings are provided in the plate, one coaxial with the main drain in a manifold block 19, and another coaxial with an auxiliary drain in the manifold block. The manifold heater plate 20 can be attached to the manifold block 19 by any suitable means, such as bolts or other similar fasteners.

Figure 5:
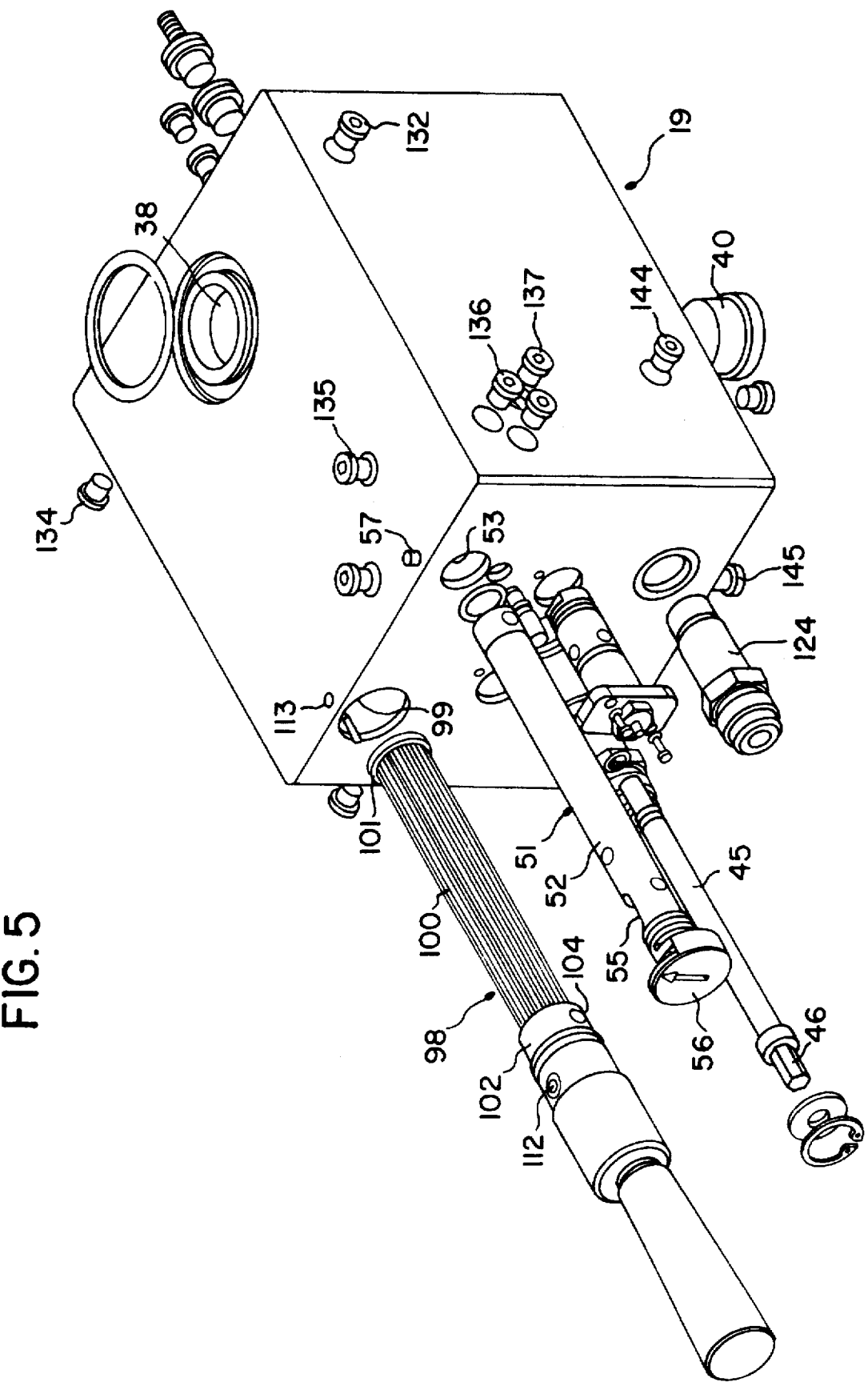
FIG. 5 is an exploded perspective view of the manifold block of FIG. 4.
Figure 10:
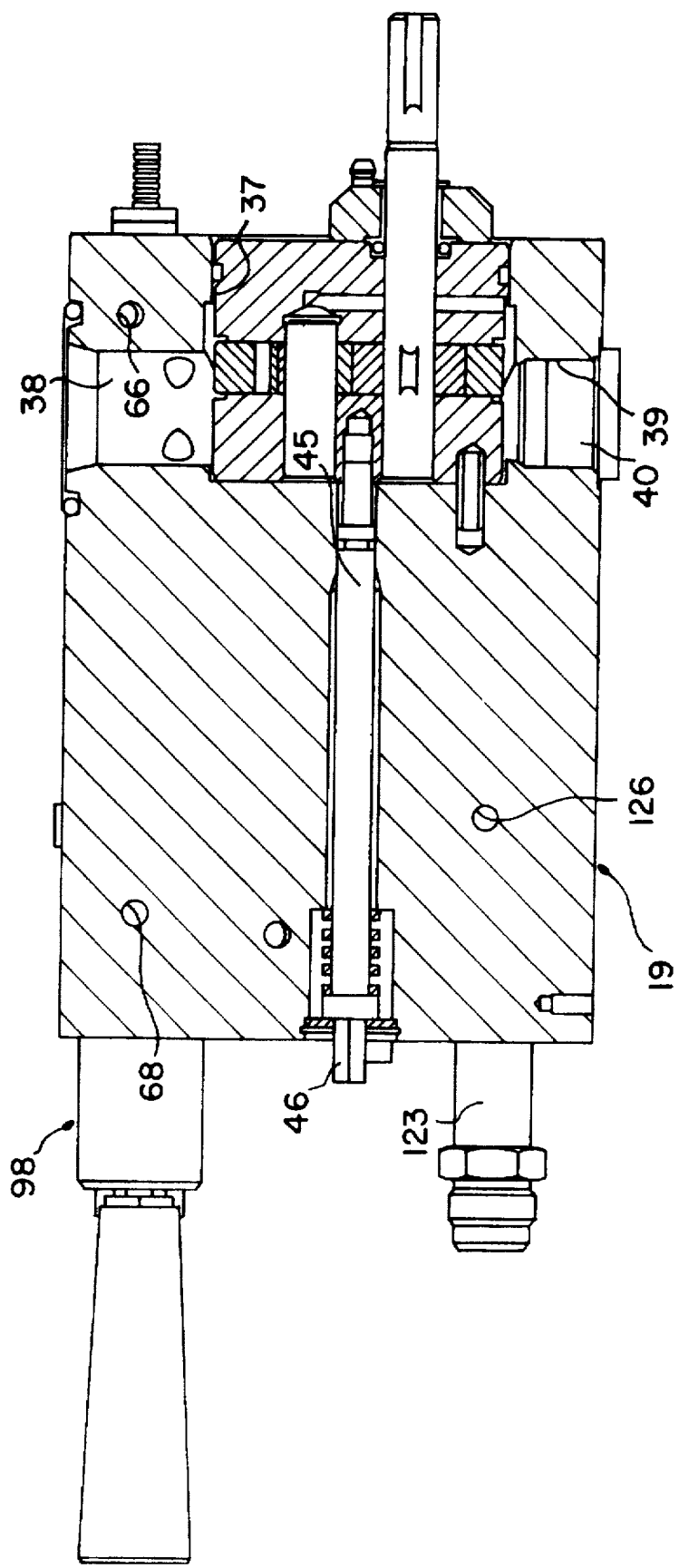
FIG. 10 is a side sectional view taken along line 10—10 of FIG. 6.

As shown in FIG. 10, the manifold block 19 has a pump cavity 37 extending from the rear of the manifold block. A main flow passageway 38 extends from the top of the manifold block to the pump cavity 37. The main passageway 38 receives the flow of molten thermoplastic material from the corresponding passageway in the reservoir block which is generally coaxial with it. A main drain 39 is also provided in the manifold block extending from the pump cavity to the bottom of the manifold block 19 and generally coaxial with the main passageway 38. The main drain 39 allows material within the supply system to drain from the system when the pump 23 is removed from the pump cavity 37. A plug 40 (FIGS. 5 and 10) is provided to close the main drain 39 and prevent material from leaking through the main drain while the system is in operation.

Figure 4:
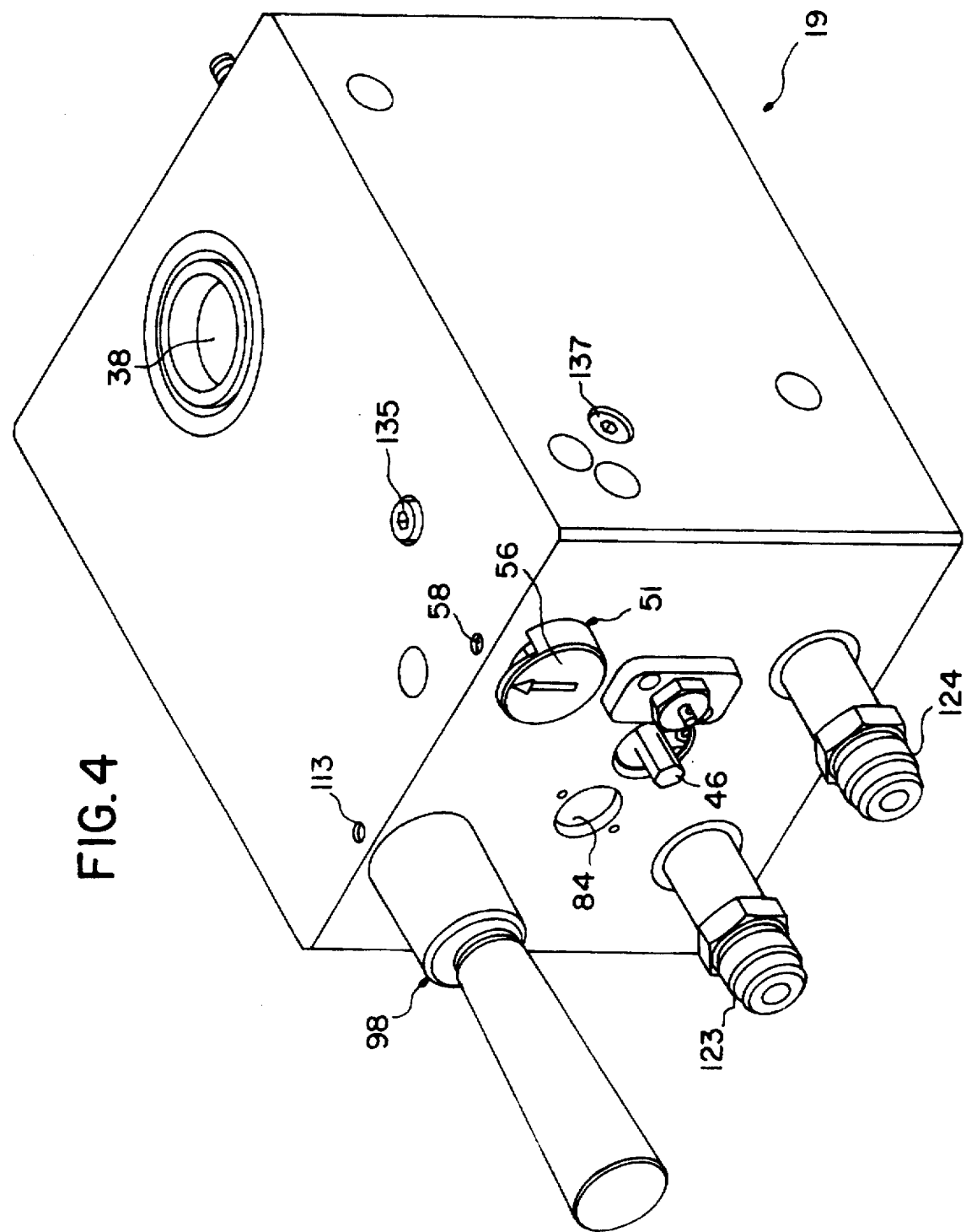
FIG. 4 is a perspective view of the manifold block of FIG. 2 from the opposite side and to a larger scale.

The pump 23 which is inserted in the pump cavity 37 is preferably a metering gear pump having an inlet on the periphery and having a central outlet, and is preferably a double gear pump. Any suitable submerged-gear-type pump may be used. The pump 23 is normally positioned in the pump cavity 37 within the manifold block, and the pump cavity 37 has an open rearward end to permit removal of the pump 23 from the manifold block 19. To assist in removing the pump 23 from the pump cavity, a screw 45 (FIG. 10) extends from the from of the manifold block 19 to the pump cavity 37 and into a corresponding threaded hole in the center of the pump casing. The "screw" 45 may be a bolt or any other threaded device which, when it engages the pump casing, moves the pump horizontally into and out of the cavity 37. Alternatively, any other device may be used to impart horizontal movement to the pump within the cavity, although a screw device is preferred. The head 46 of the screw 45 (FIGS. 4 and 10) is accessible from the front panel of the manifold block 19. When the screw 45 is turned in one direction, e.g., counterclockwise, it pushes the pump 23 rearwardly and out of the pump cavity 37. When the screw 45 is turned the other direction, e.g., clockwise, it pulls the pump 23 into the pump cavity 37. The screw 45 provides the initial movement of the pump 23 for removal and the final movement of the pump for replacement, with the remaining removal or replacement movement of the pump 23 provided by the movement of the slidable carriage 25.

Figure 13:
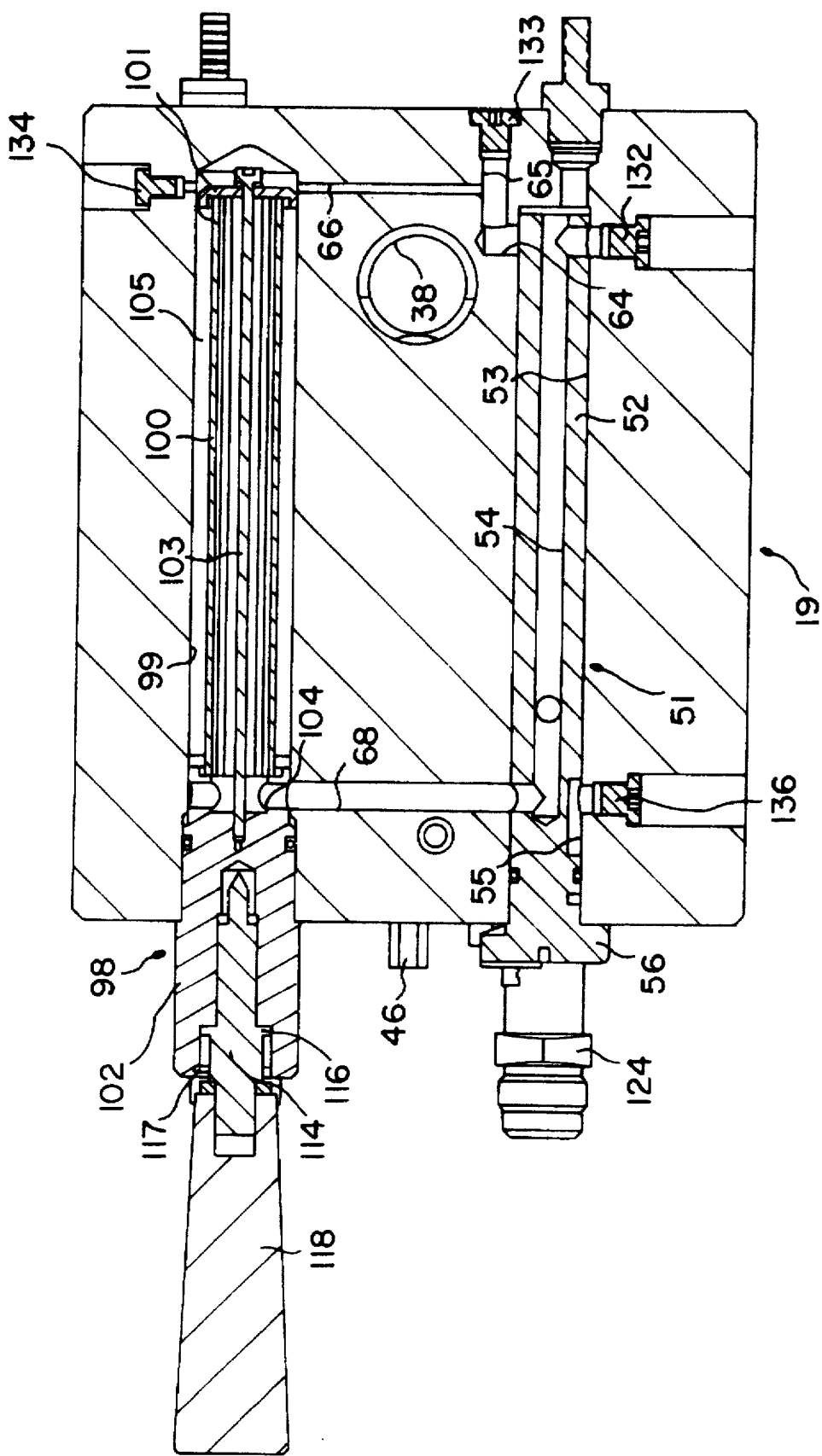
FIG. 13 is a top sectional view taken along line 13—13 of FIG. 7.

The flow of the molten material through the manifold block 19 is controlled by a valve assembly 51 (FIGS. 8 and 13) comprising a valve body 52 extending within a horizontal bore 53 which extends rearwardly from the front of the manifold block. The valve body 52 comprises an elongated tubular body with an interior central axial passageway 54 and an exterior flow channel 55 formed as a groove around the valve body near its forward end. The body 52 is integrally connected to an actuating knob 56 which extends from the front of the manifold block. The valve body 52 is held within the bore 53 by a pin 57 which extends through a hole 58 from the top of the manifold block 19 and which engages a groove 59 in the body near the knob 56. The groove 59 extends partially around the periphery of the valve body 52 and permits rotation of the valve body between a "run" position as shown in FIG. 13 and a "flush" position oriented at 90° with respect to the "run" position.

The manifold block 19 has a system of passageways for the flow of thermoplastic material which connect the pump 23, the valve assembly 51 and the various other elements of the manifold. This passageway system includes four passageways which extend through the manifold block 19 to the valve bore 53 and selectively communicate with each other according to the position of the valve. The first passageway which extends to the valve bore is the short passageway 64 (FIG. 13) which extends horizontally from the valve at the rear of the bore 53. The passageway 64 is connected to another short passageway 65 which extends horizontally rearwardly parallel to the valve bore 53. The passageway 65 is, in turn, connected to a passageway 66 which extends horizontally across the rear of the manifold block 19. The second passageway which extends to the valve bore is a passageway 67 (FIG. 8) which extends vertically up to the bore 53 and which is connected to the outlet of the pump 23. A third passageway 68 (FIG. 13) extends horizontally from the front of the bore 53 across the front of the manifold block 19. A fourth passageway 69 extends horizontally from the bore below the bore and is connected to the valve assembly 51 by means of a drain valve assembly 70. When the valve assembly 51 is in the "run" position as shown in FIG. 13, the central passageway 54 in the valve body 52 connects the passageways 67 and 68, while the passageways 64 and 69 are closed. When the valve assembly 51 is in the "flush" position, the interior valve body passageway 54 connects the passageways 64 and 67, and the exterior flow channel 55 connects the passageway 68 with the passageway 69 through the drain valve assembly 70.

Figure 9:
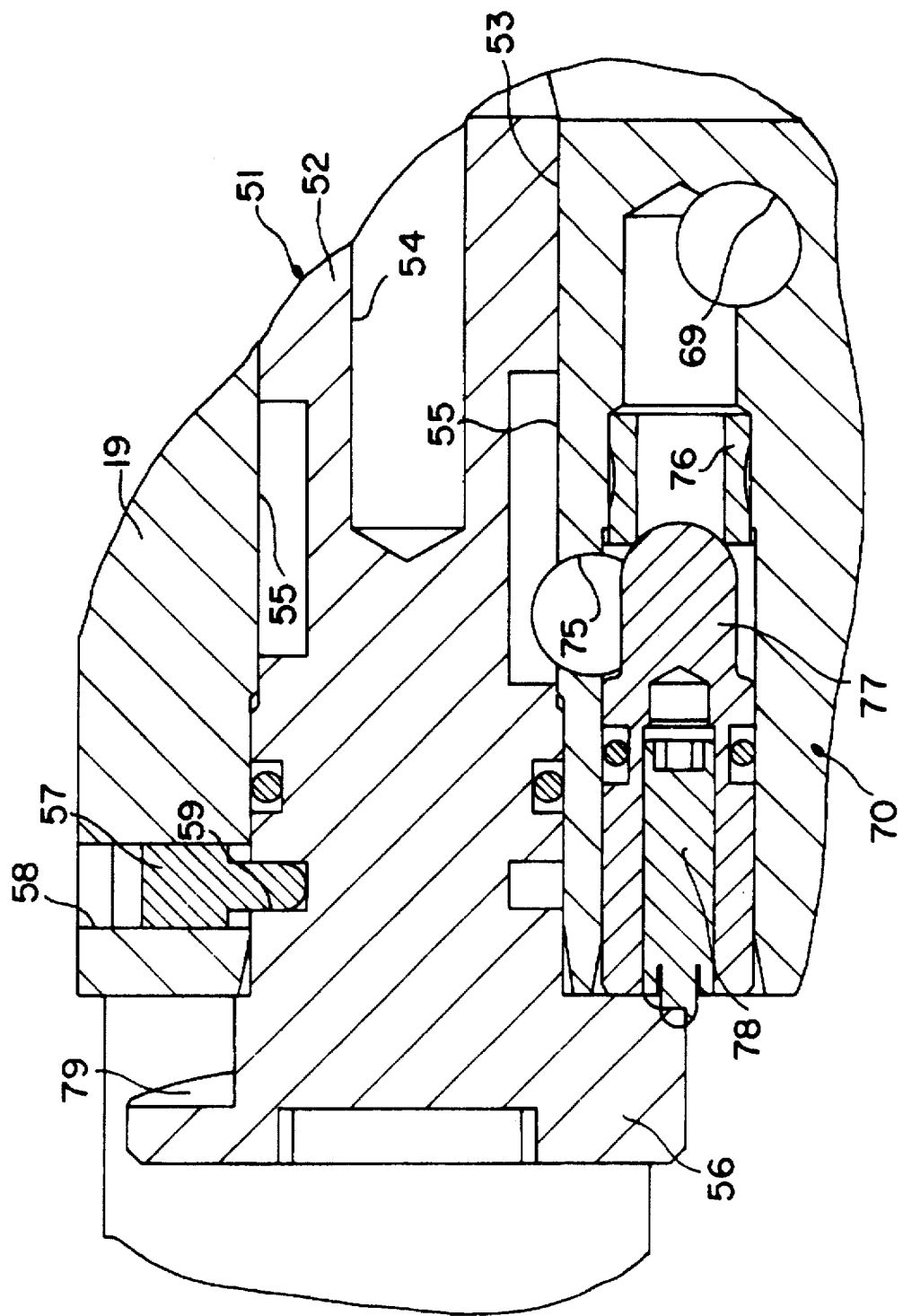
FIG. 9 is a detailed sectional view of a portion of FIG. 8 to a larger scale.

The drain valve assembly 70 which is located just below the front of the valve assembly 51 is shown in more detail in FIG. 9. The drain valve assembly 70 comprises a chamber 75 formed just below the valve bore 53 and connected to the valve bore. A cylindrical valve seat 76 is positioned in the chamber 75. The seat 76 is preferably formed of a carbine material which is relatively hard and provides a long life. A valve poppet 77 is positioned to move horizontally within the chamber 75 between a closed position (toward the right as shown in FIG. 9) in which it engages the valve seat 76 and an open position (toward the left as shown in FIG. 9) in which it is spaced from the valve seat. The valve poppet 77 is urged to the closed position by an actuating member 78 engages the valve knob 56. The rearward surface of the valve knob 56 is provided with a camming groove 79 which is engaged by the forward end of the actuating member 78. When the valve assembly 51 is in the "run" position as shown in FIG. 9, the actuating member 78 is pushed into the manifold block 19, and the valve poppet 77 is pushed to the closed position. The poppet 77 is configured so that the presence of pressurized fluid within the chamber 75 will cause the poppet to move to the open position, allowing the pressurized fluid to flow from the chamber and into the passageway 69. When the valve assembly 51 is in the "drain" position, the camming groove 79 is spaced away from the front surface of the manifold block 19, allowing the actuating member 78 to move out of the manifold block and allowing the poppet 77 to open in response to the pressure of the fluid in the chamber 75.

Figure 11:
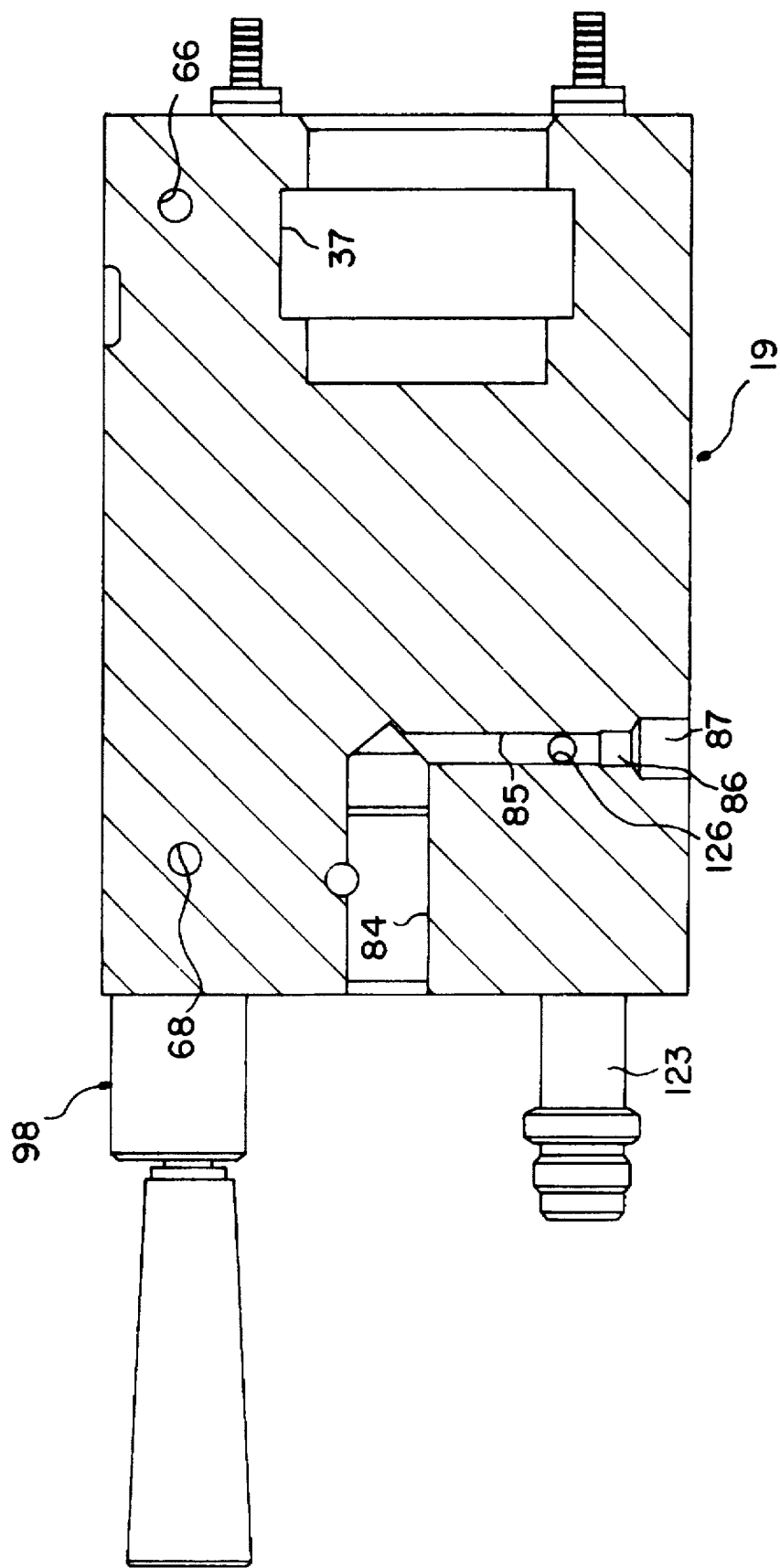
FIG. 11 is a side sectional view taken along line 11—11 of FIG. 6.

The horizontal drain passageway 69 connects with an enlarged passageway 84 (FIG. 11) which extends horizontally inwardly from the front of the manifold block 19, which, in turn, is connected to a passageway 85 which extends vertically downwardly to an auxiliary drain 86. A removable drain plug 87 is inserted in the auxiliary drain 86.

Figure 15:
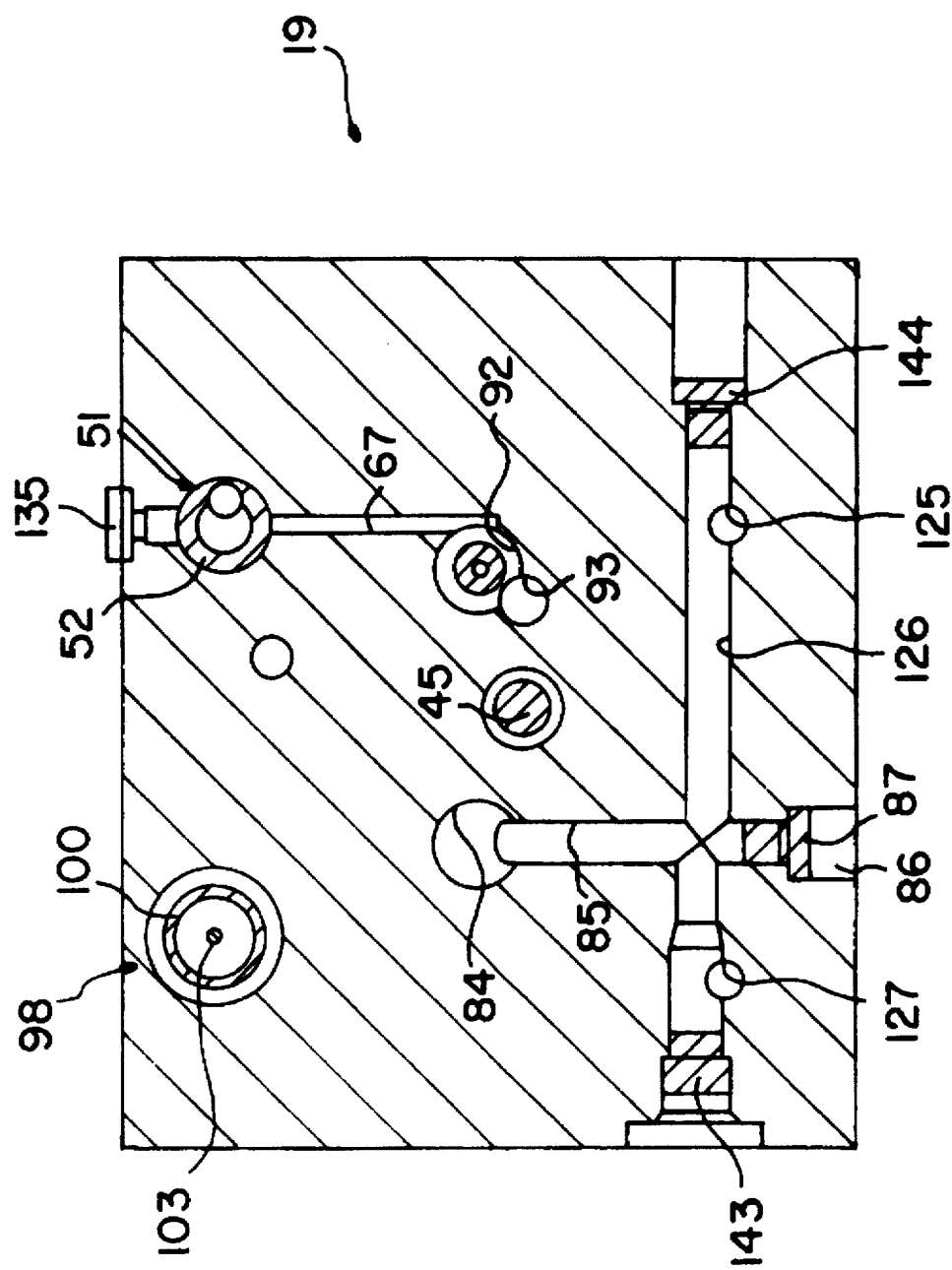
FIG. 15 is an end sectional view taken along line 15—15 of FIG. 6.

The passageway 67 (FIG. 8) which extends vertically up to the bore 53 is connected to an auxiliary valve assembly 92 which is used to cutoff flow of material to the main valve assembly 51 so that the main valve assembly can be removed for service or replacement. The passageway 67 is connected through the auxiliary valve assembly 92 to a passageway 93 (FIG. 15) which extends horizontally rearwardly to the pump cavity 37. The enlarged passageway 84 is configured such that a valve assembly similar to the auxiliary valve assembly 92 may be mounted in it to control the flow of material to the auxiliary drain 86.

Figure 12:
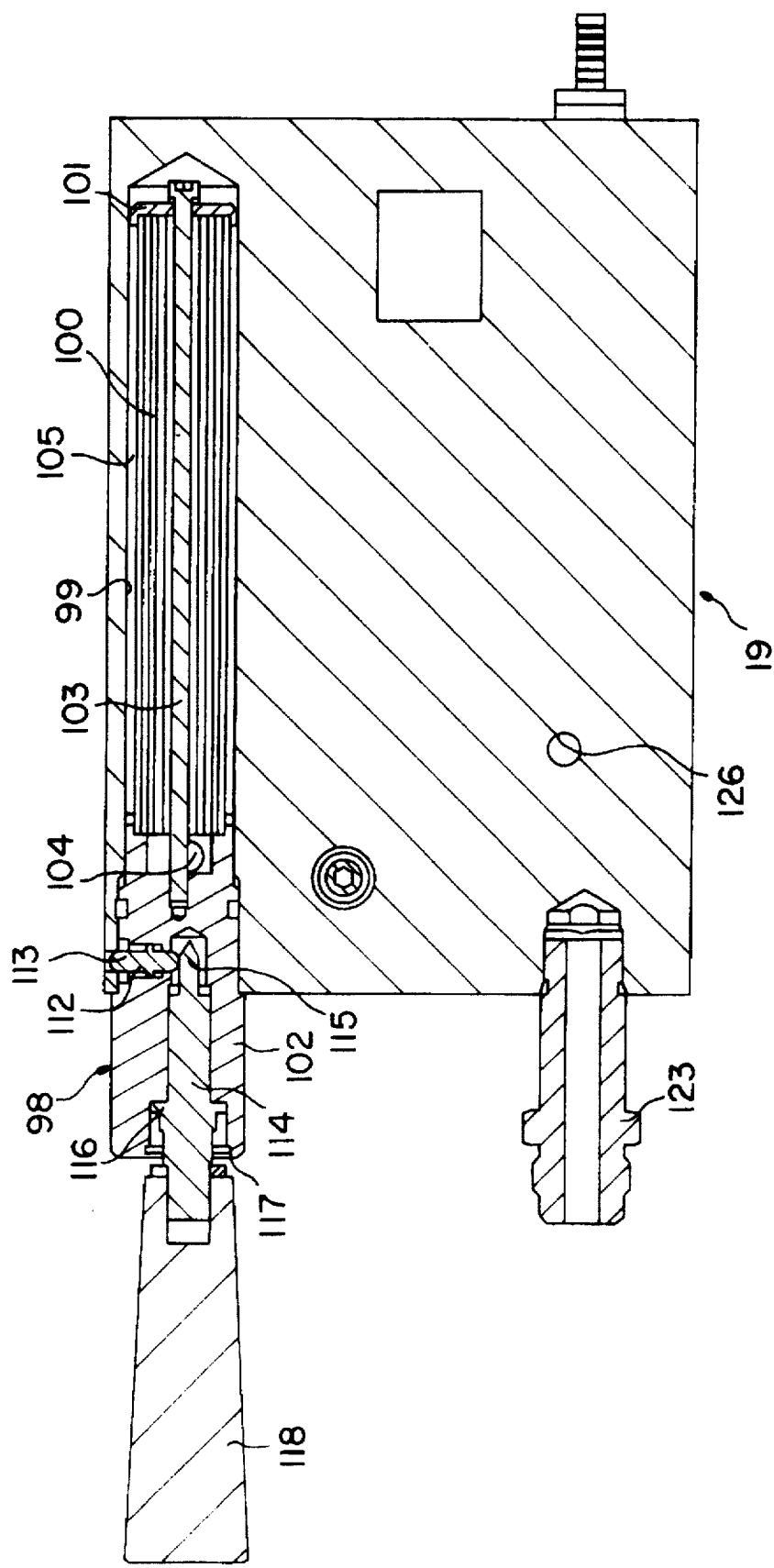
FIG. 12 is a side sectional view taken along line 12—12 of FIG. 6.
Figure 14:
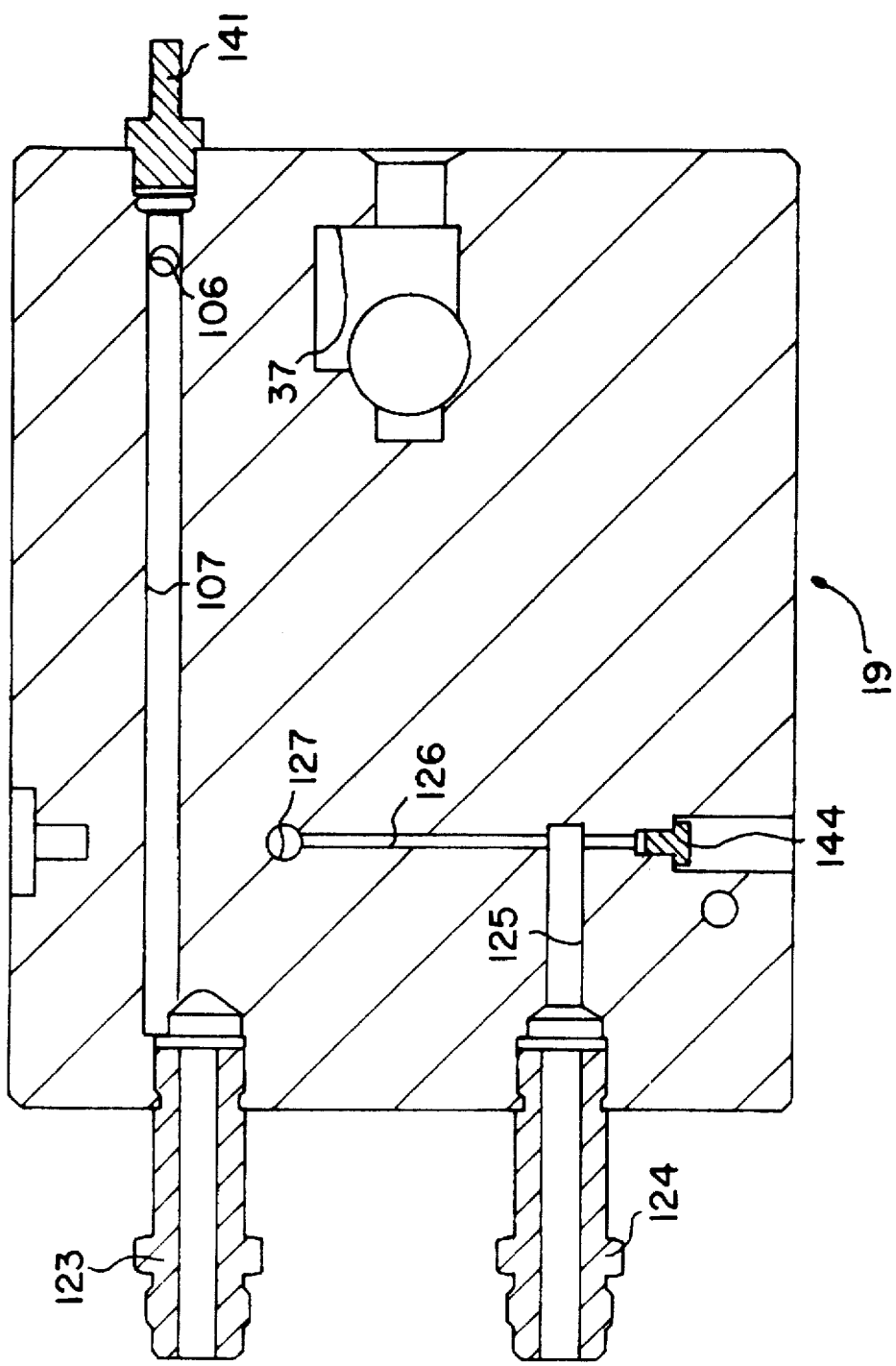
FIG. 14 is a top sectional view taken along line 14—14 of FIG. 7.

The final filtering of the molten thermoplastic material before dispensing is provided by a filter assembly 98 (FIGS. 12 and 13) located in a bore 99 in the manifold block 19. The filter assembly 98 comprises a cylindrical filter element 100 attached at one end to a rear end cap 101 and at the other end to a front filter body member 102. The filter element 100 is preferably a cylinder of sheet metal mesh or screen, which is relatively inexpensive and has a long useful life. The filter material is also preferably self supporting, so that no internal or external support liners are required, and the filter can withstand pressure across the filter in either direction. A rod 103 extends within the cylindrical filter element 100 between the rear end cap 101 and the front body member 102 to hold the filter element 100 in position. The filter body member 102 has a port 104 (FIG. 13) which allows the molten material to enter or leave the interior of the cylindrical filter element 100. The front port 104 communicates with the passageway 65 which extends horizontally through the manifold block 19 between the filter bore 99 and the valve bore 53 near the front of the manifold block. The cylindrical filter element 100 is spaced from the interior sidewalls of the bore 99 creating a chamber 105 around the filter element. At the rearward end of the bore 99, the chamber 105 communicates with a vertically extending passageway 106 (FIG. 14) which connects with a horizontally extending passageway 107 extending through the manifold block beneath the filter bore and generally parallel to it. The chamber 105 is also connected to the rearward end of the valve bore 53 at the rearward end of the bore 99 by means of the horizontally extending passageways 64, 65 and 66.

The filter body member 102 is maintained within the filter bore 99 by a pin 112 (FIG. 12) which extends from the body member into a hole 113 extending from the bore to the top of the manifold block. The pin 112 is cammed upwardly into the opening by a connecting member 114 which has a forward camming portion 115 which engages the bottom of the pin and urges it upwardly into the hole 113 to secure the filter assembly in the bore. A flange 116 is formed in the middle of the connecting member 114, and the flange can move axially within a chamber formed in the forward end of the filter body member 102. The forward end of this chamber is closed by a lock ring 117 to capture the connecting member 114 within the filter body member 102. When the flange 116 moves toward the forward end of the filter body member 102, the camming portion 115 clears the pin 112, and the pin is free to drop into the body member and clear of the hole 113 in the manifold block to allow the filter assembly 98 to be removed from the bore 99. The forward end of the connecting member 114 is threaded and engages a corresponding threaded opening in a handle 118 mounted on the front end of the filter body member 102. By rotating the handle 118 relative to the filter body member 102, the connecting member 114 can be moved axially with respect to the filter body member to engage and disengage the pin 112 from the hole 113.

The molten thermoplastic material is provided from the manifold block 19 to the dispenser through a pair of hose connection fittings 123 and 124 (FIG. 14) which extend from the front the manifold block 19. One of the fittings 123 is used for connection for a supply hose providing the main supply of molten thermoplastic material to the dispenser. The other fitting 124 can be used as a connection for a return hose, such as is used in a recirculating system. In a recirculating system, it is necessary to maintain a constant flow of the molten thermoplastic material in the hoses at all times to maintain the material at the desired temperature and pressure. If the dispenser is shutoff or otherwise stops functioning, the thermoplastic material which is being pumped to the dispenser is returned to the supply system using the supply hose. The supply hose fitting 123 is connected to the horizontally extending passageway 107 which connects to the filter assembly 98 by means of the passageway 106. The return hose fitting 124 is connected to a short horizontally extending passageway 125 which connects to a transverse horizontal passageway 126 (FIG. 15) which, in turn, connects to a passageway 127 which extends vertically through the manifold block 19. The passageway 127 is also connected to the auxiliary drain 86 by means of the passageway 85.

In the manufacture of the manifold block, it is necessary that each of the various passageways extend to the exterior of the manifold block, so that the passageways can be machined into the block during manufacture. The unnecessary portions of the passageways or "blind" passages are plugged to prevent the flow of material through these portions. Thus a plug 132 closes the passageway 64, a plug 133 closes the passageway 65, a plug 134 closes the passageway 66, a plug 135 closes the passageway 67, a plug 136 closes the passageway 68, a plug 137 closes the passageway 69, a plug 140 closes the passageway 106, a plug 141 closes the passageway 107, plugs 143 and 144 close the passageway 126, and a plug 145 closes the passageway 127.

In use, the molten material enters the manifold block 19 from the reservoir block 16 through the main passageway 38 and flows into the pump cavity 37 where it is pumped by the pump 23 into the passageway 93. The material travels through the passageway 93 and through the passageway 67 to the valve assembly 51. With the valve assembly 51 in the "run" position, the material travels from the passageway 67 through the central passageway 54 in the valve body 52 to the front horizontal passageway 68. From the front passageway 68 the material travels to the filter assembly 98. The material flows through the port 104 in the filter body member 102 and into the interior of the cylindrical filter element 100. The material flows through the filter element 100 and into the chamber 105 around the filter element. From the chamber 105, the material flows through the passageways 106 and 107 to the fitting 123 for the supply hose.

When it is desired to back flush the filter assembly 98, the valve assembly 51 is repositioned to the "flush" position. The material flows from the pump cavity 37 through the passageways 93 and 67 to the valve assembly 51. From the passageway 67 the material flows through the central passageway 54 in the valve body 52 to the passageways 64, 65 and 66 and to the filter chamber 105. From the filter chamber 105, the material flows backwards through the cylindrical filter element 100 into the interior of the filter element and through the port 104 in the filter body member 102, thereby back flushing the filter element of contaminants which have been captured by the filter element and which have accumulated in the interior of the filter element. The material, carrying with it any contaminants which have accumulated within the filter element 100, flows back to the valve assembly 51 through the passageway 65. From the passageway 65 the material flows through the exterior flow channel 55 formed around the valve body 52 and to the drain valve assembly 70. With the valve body 52 in the "flush" position, the actuating member 78 can move forward, allowing the valve poppet 77 to move the open position in response to the pressure of the fluid in the chamber 75. With the drain valve assembly 70 open, the material flows from the drain valve through the passageways 69, 84 and 85 and out the manifold block 19 through the auxiliary drain 86.

The filter assembly 98 can also be removed from the manifold block 19 as necessary for more thorough cleaning. To remove the filter assembly 98, the user turns the handle 118. As the handle is rotated, the threaded engagement between the handle 118 and the connecting member 114 causes the connecting member to be pulled from the filter body member 102. As the connecting member 114 moves axially forward, the camming portion 115 of the connecting member clears the pin 112, allowing the pin to drop downwardly into the filter body member 102 and clear of the hole 113 in the manifold block. The filter assembly 98 can then be pulled out directly from the bore 99 without rotating the filter element 100 and possibly dislodging contaminants within the filter element. After cleaning the filter element, the filter assembly 98 is reinstalled in the manifold block by reversing the procedure. The filter assembly 98 is inserted into the bore 99, and the handle 118 is rotated in the opposite direction so that the threaded engagement between the handle and the connecting member 114 causes the connecting member to move axially rearwardly. The camming portion 115 of the connecting member engages the bottom of the pin 112, pushing the pin upwardly so that it engages the hole 113 to hold the filter assembly in place. Thus the filter assembly can be removed and re-installed without tools and with minimal operational steps.

The manifold block which has been shown and described is a "single stream" manifold, in that it provides for a single supply of material using a single pump. The design can be modified to provide a dual stream, in which two supplies are provided with a single pump. In the dual stream design, two valve assemblies, two filter assemblies, two supply hose fittings, and two return hose fittings would be provided. An example of such a dual stream manifold block 19' is shown in FIG. 16. The interior passageways in the dual stream manifold block 19' correspond to those provided in the single stream manifold block 19 just described, except that duplicate streams would be provided on each side of the manifold block to provide for separate supplies of material. Thus the dual stream manifold block has a single main passageway 38' and a single pump, but it has two valve assemblies 51', two filter assemblies 98', two supply hose fittings 123' and two return fittings 124'. The dual stream manifold block 19' is identical in exterior dimensions to the single stream manifold block 19, so that the user can replace the single stream manifold with a dual stream manifold if it is necessary to provide an additional supply of material without otherwise modifying the supply system. Thus the manifold design of this invention allows the user to reconfigure the system as necessary to provide additional capability without replacing other system components, and provides a useful modular design.

Other variations and modifications of the specific embodiments herein shown and described will be apparent to those skilled in the art, all within the intended spirit and scope of the invention. While the invention has been shown and described with respect to particular embodiments thereof, these are for the purpose of illustration rather than limitation. Accordingly, the patent is not to be limited in scope and effect to the specific embodiments herein shown and described nor in any other way that is inconsistent with the extent to which the progress in the art has been advanced by the invention.

What is claimed is:

1. A system for supplying melted thermoplastic material to a dispenser through a supply hose, which comprises:
   a hopper for storing the thermoplastic material;
   a heating grid associated with the hopper for heating and melting the thermoplastic material;
   a reservoir block for receiving melted material from the grid, the reservoir block including a reservoir into which the melted material flows from the grid; and
   a manifold assembly supported below the reservoir block for receiving material from the reservoir, the manifold assembly including
      a fitting for connection to the supply hose,
      a pump for pumping the material through the supply hose to the dispenser,
      a passageway system connecting the pump to the fitting for supplying a flow of material from the pump to the fitting,
      a filter connected to the passageway system for filtering impurities in the material after the material has been pumped, and
      a valving arrangement connected to the passageway system and separate from the filter which selectively directs a flow of the material in the passageway system through the filter to backflush the filter.

2. A system for supplying molten thermoplastic material as defined in claim 1, wherein the manifold assembly comprises in addition, a drain into which the material flows after back flushing the filter.

3. A system for supplying molten thermoplastic material as defined in claim 2, wherein the manifold assembly comprises in addition, a drain valve which opens automatically when material flows to the drain after back flushing the filter.

4. A system for supplying molten thermoplastic material as defined in claim 3, wherein the drain valve opens in response to pressure of the material from the pump.

5. A system for supplying molten thermoplastic material as defined in claim 1, wherein the valving arrangement includes a valve which can be selectively positioned in either a "run" position or a "flush" position.

6. A system for supplying molten thermoplastic material as defined in claim 5, wherein the material flows from the pump through the filter and to the fitting when the valving arrangement is in the "run" position and wherein the material flows from the pump backwards through the filter and to a drain when the valving arrangement is in the "flush" position.

7. A system for supplying molten thermoplastic material as defined in claim 1, wherein the filter is removable.

8. A system for supplying melted thermoplastic material to a dispenser through a supply hose, which comprises:
   a hopper for storing the thermoplastic material;
   a heating grid associated with the hopper for heating and melting the thermoplastic material;
   a reservoir block for receiving melted material from the grid, the reservoir block including a reservoir into which the melted material flows from the grid; and
   a manifold assembly supported below the reservoir block for receiving material from the reservoir, the manifold assembly including
      a fitting for connection to the supply hose,
      a pump for pumping the material through the supply hose to the dispenser,
      a passageway system connecting the pump to the fitting for supplying a flow of material from the pump to the fitting, and
      a filter connected to the passageway system for filtering impurities in the material after the material has been pumped, the filter including a removal mechanism permitting the filter to be removed from the manifold assembly without disturbing impurities in the filter, the removal mechanism including a locking pin which extends into the manifold assembly to secure the filter, the locking pin being disengagable from the manifold assembly to allow the filter to be removed.

9. A system for supplying melted thermoplastic material to a dispenser through a supply hose, which comprises:
   a hopper for storing the thermoplastic material;
   a heating grid associated with the hopper for heating and melting ther thermoplastic material:
   a reservoir block for receiving melted material from the grid, the reservoir block including a reservoir into which the melted material flows from the grid; and
   a manifold assembly supported below the reservoir block for receiving material from the reservoir, the manifold assembly including
      a fitting for connection to the supply hose,
      a pump for pumping the material through the supply hose to the dispenser,
      a passageway system connecting the pump to the fitting for supplying a flow of material from the pump to the fitting, and
      a filter connected to the passageway system for filtering impurities in the material after the material has been pumped, the filter including a removal mechanism permitting the filter to be removed from the manifold assembly without rotating the filter to disturb impurities in the filter.

10. A system for supplying melted thermoplastic material to a dispenser through a supply hose, which comprises:
    a hopper for storing the thermoplastic material;
    a heating grid associated with the hopper for heating and melting the thermoplastic material;
    a reservoir block for receiving melted material from the grid, the reservoir block including a reservoir into which the melted material flows from the grid; and
    a manifold assembly supported below the reservoir block for receiving material from the reservoir, the manifold assembly including
       a fitting for connection to the supply hose,
       a pump for pumping the material through the supply hose to the dispenser,
       a passageway system connecting the pump to the fitting for supplying a flow of material from the pump to the fitting, and
       a filter connected to the passageway system for filtering impurities in the material after the material has been pumped, the filter including a handle for removal of the filter and a removal mechanism permitting removal of the filter from the manifold assembly without disturbing impurities in the filter.

11. A system for supplying melted thermoplastic material as defined in claim 10, wherein the filter includes a retractable member for engaging the manifold assembly to hold the filter within the manifold assembly in a fixed position.

12. A system for supplying melted thermoplastic material as defined in claim 11, wherein the handle is connected to the retractable member to operate the retractable member to hold and to release the filter from the manifold assembly.

13. A manifold assembly for a system which supplies melted thermoplastic material to a dispenser through a supply hose, the manifold assembly comprising:
    a fitting for connection to the supply hose;
    a pump for pumping the material through the supply hose to the dispenser;
    a passageway system connecting the pump to the fitting for supplying a flow of material from the pump to the fitting;
    a filter connected to the passageway system for filtering impurities in the material after the material has been pumped, the filter including a removal mechanism permitting the filter to be removed from the manifold assembly without rotating the filter;
    a valving arrangement connected to the passageway system and separate from the filter which selectively directs a flow of the material through the filter to backflush the filter;
    a drain into which the material flows after backflushing the filter; and
    a drain valve which opens automatically when material flows to the drain after backflushing the filter.

14. A manifold assembly as defined in claim 13, wherein the drain valve opens in response to pressure of the material from the pump.

15. A manifold assembly as defined in claim 13, wherein the valving arrangement includes a valve which can be selectively positioned in either a "run" position or a "flush" position.

16. A manifold assembly as defined in claim 15, wherein the material flows from the pump through the filter and to the fitting when the valving arrangement is in the "run" position and wherein the material flows from the pump backwards through the filter and to a drain when the valving arrangement is in the "flush" position.

17. A manifold assembly as defined in claim 13, wherein the filter includes a handle for removal of the filter.

18. A manifold assembly as defined in claim 17, wherein the filter includes a retractable member for engaging the manifold assembly to hold the filter within the manifold assembly in a fixed position.

19. A manifold assembly as defined in claim 18, wherein the handle is connected to the retractable member to operate the retractable member to hold and to release the filter from the manifold assembly.

* * * * *

UNITED STATES PATENT AND TRADEMARK OFFICE
CERTIFICATE OF CORRECTION

PATENT NO. : 5,706,982
DATED : January 13, 1998
INVENTOR(S) : Siddiqui et al.

It is certified that error appears in the above-identified patent and that said Letters Patent is hereby corrected as shown below:

Column 2, line 20 "back flushing" should be --backflushing--.
Column 5, line 59, "from" (second instance) should be --front--.
Column 10, line 59, "back flushing" should be --backflushing--.
Column 10, line 63, "back flushing" should be --backflushing--.
Column 11, line 46, "ther" should be --the--.
Column 11, line 46, the colon ":" should be a semi-colon --;--.

Signed and Sealed this

Fifth Day of May, 1998

*Attest:*

BRUCE LEHMAN

*Attesting Officer*  Commissioner of Patents and Trademarks